(12) United States Patent
Martin et al.

(10) Patent No.: US 11,030,835 B2
(45) Date of Patent: Jun. 8, 2021

(54) FRICTIONLESS ACCESS CONTROL SYSTEM PROVIDING ULTRASONIC USER LOCATION

(71) Applicant: Sensormatic Electronics, LLC, Boca Raton, FL (US)

(72) Inventors: Walter A. Martin, Ballymena (GB); John McKenna, Maghera (GB); Derek Boyes, Craigavon (GB); Terry Neill, Lisburn (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/205,806

(22) Filed: Nov. 30, 2018

(65) Prior Publication Data

US 2019/0172286 A1    Jun. 6, 2019

Related U.S. Application Data

(60) Provisional application No. 62/593,522, filed on Dec. 1, 2017.

(51) Int. Cl.
*G07C 9/28* (2020.01)
*G07C 9/00* (2020.01)
(Continued)

(52) U.S. Cl.
CPC ............ *G07C 9/00182* (2013.01); *G01S 5/20* (2013.01); *G07C 9/00571* (2013.01); *G07C 9/27* (2020.01); *G07C 9/28* (2020.01); *G07C 9/30* (2020.01); *G07C 2009/00793* (2013.01); *G07C 2009/00801* (2013.01); *G07C 2209/63* (2013.01)

(58) Field of Classification Search
CPC ... G01S 15/87; G07C 9/0007; G07C 9/00126; G07C 9/00182; G07C 2009/00261; G07C 2009/00365; G07C 2009/00373; G07C 2009/00801; G07C 2009/00928; G07C 2209/63
See application file for complete search history.

(56) References Cited

U.S. PATENT DOCUMENTS

| 4,492,492 A | * | 1/1985 | Izawa | ..................... E02F 5/105 |
| | | | | 367/19 |
| 2003/0009101 A1 | * | 1/2003 | Sunagawa | .......... A61B 5/02007 |
| | | | | 600/437 |

(Continued)

*Primary Examiner* — Benyam Haile
(74) *Attorney, Agent, or Firm* — HoustonHogle LLP

(57) ABSTRACT

A frictionless access control system and method providing ultrasonic user location are disclosed. The access control system authorizes users within proximity of an access point such as a door, based upon user information (e.g. credentials) sent in RF wireless messages from user devices carried by the users. When the users are authorized, the system instructs the user devices to transmit coded acoustic signals. An positioning unit at the access point includes an ultrasonic microphone array, which is located above the access point and detects the acoustic signals. The positioning unit determines an angle of arrival (AoA) of the acoustic signals at microphones of the array, and determines positions of the users relative to the access point from the AoA. In one implementation, pre-authorized users are granted access when the determined positions of the users are within an inner zone of the access point.

29 Claims, 7 Drawing Sheets

(51) Int. Cl.
*G01S 5/20* (2006.01)
*G07C 9/27* (2020.01)
*G07C 9/30* (2020.01)

(56) References Cited

U.S. PATENT DOCUMENTS

| | | | | |
|---|---|---|---|---|
| 2009/0040873 | A1* | 2/2009 | Schreurs | G01V 1/38 367/154 |
| 2012/0127317 | A1* | 5/2012 | Yantek | G01V 8/14 348/156 |
| 2014/0144389 | A1* | 5/2014 | Richards | A01K 15/02 119/712 |
| 2015/0184628 | A1* | 7/2015 | Fan | B60R 25/24 701/2 |
| 2017/0372055 | A1* | 12/2017 | Robinson | H04L 63/0853 |
| 2018/0189716 | A1* | 7/2018 | Crone | G06Q 10/08355 |

\* cited by examiner

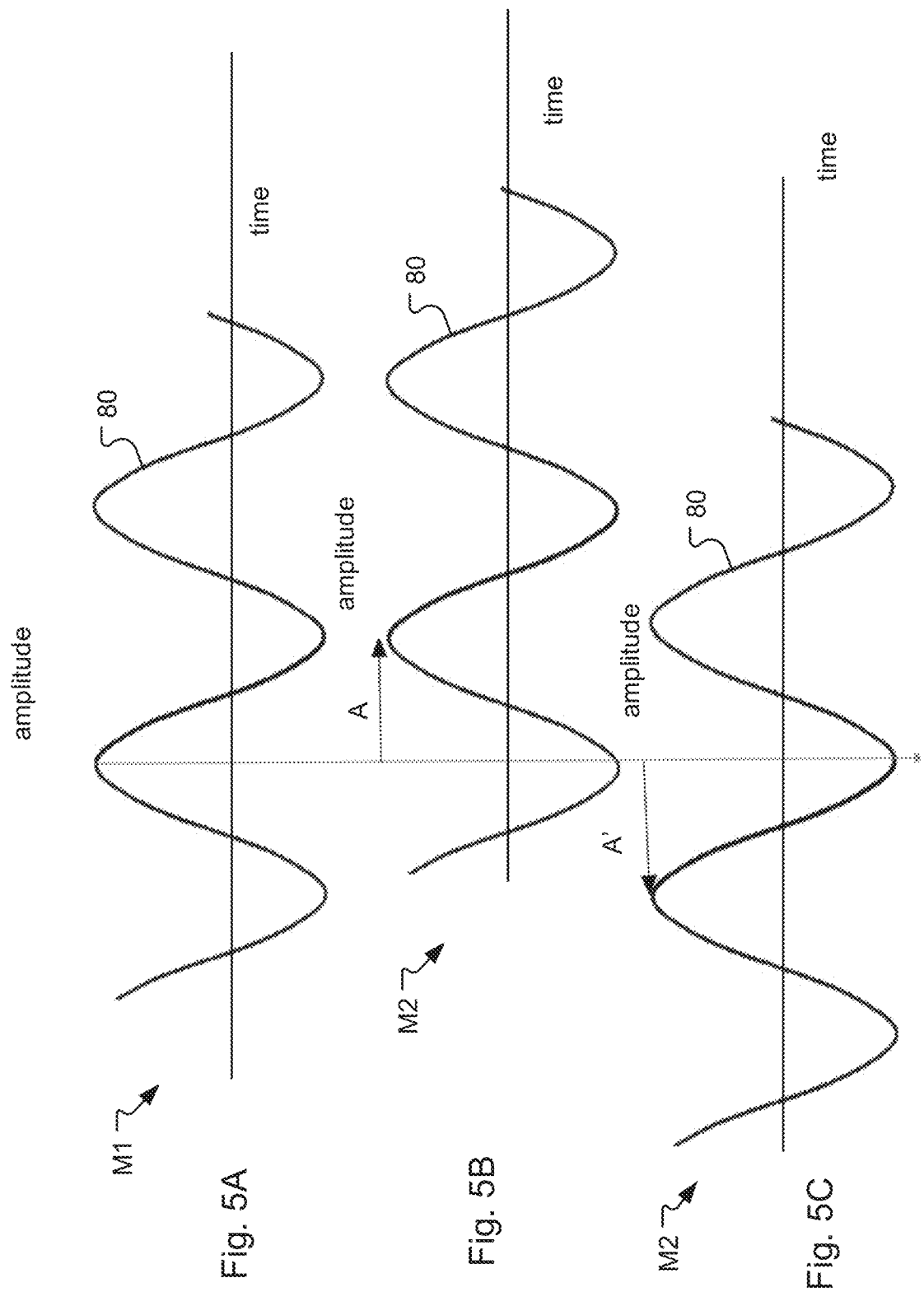

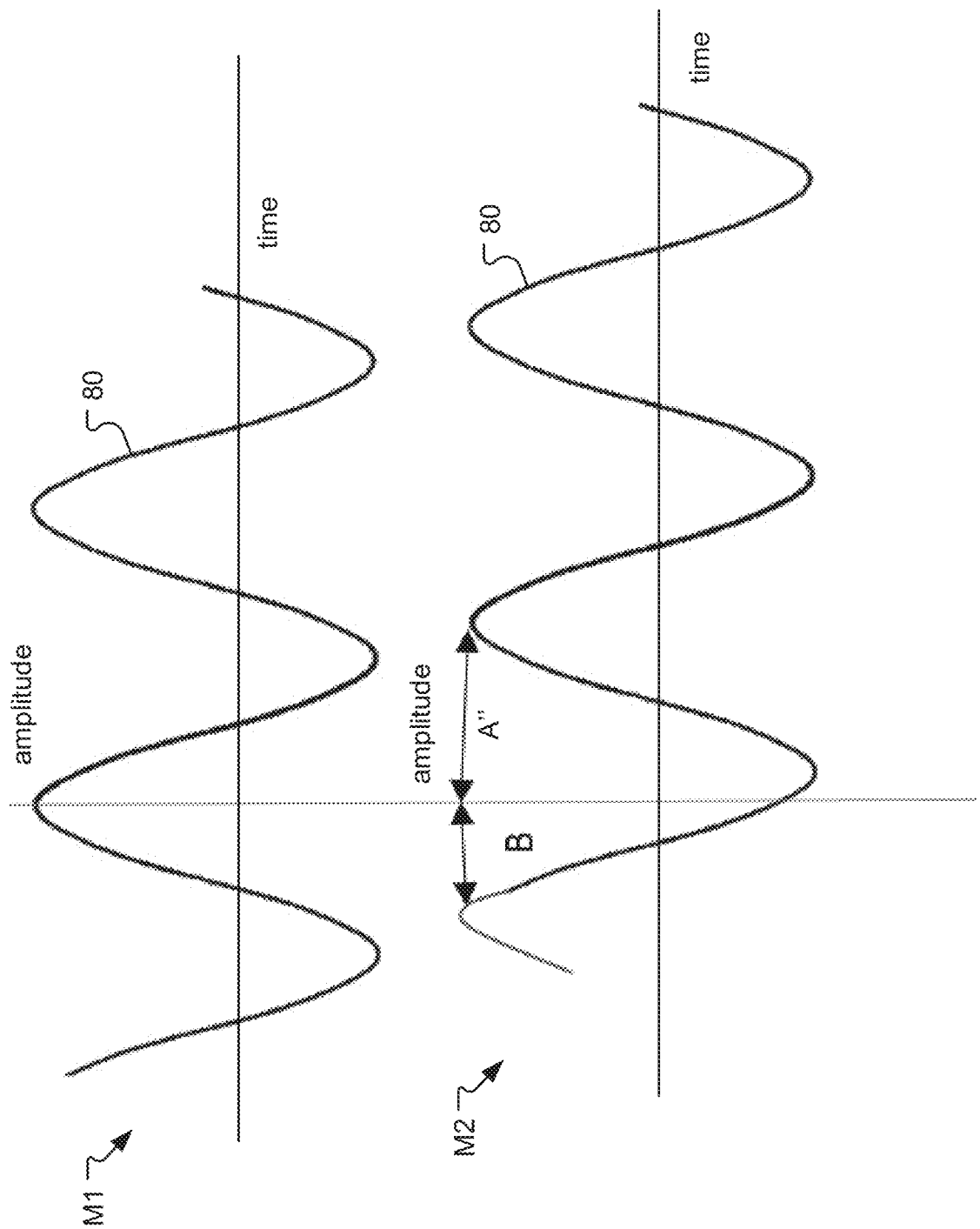

FRICTIONLESS ACCESS CONTROL SYSTEM PROVIDING ULTRASONIC USER LOCATION

RELATED APPLICATIONS

This application claims the benefit under 35 USC 119(e) of U.S. Provisional Application No. 62/593,522, filed on Dec. 1, 2017, which is incorporated herein by reference in its entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control systems, surveillance cameras, image analytics systems, and/or video management systems, to list a few examples.

The access control systems are principally concerned with physical security and the selective access to, restriction of access to, and/or notification of access to a place or other resource. Historically, the main components of the access control systems were card readers and possibly door controllers. The card readers were often installed to enable presentation of credentials, encoded on the cards, to obtain access to restricted areas, such as buildings or areas of the buildings. The card readers were installed near access points, such as doors or hallways or elevators. Typically, individuals would interact with the card readers by swiping keycards or bringing contactless smart cards within range of the readers. The card readers would read the credential information of the keycards and validate the information possibly by reference to a verification system that confirmed the credentials and determined if the individuals were authorized to access the restricted areas. The credential information might include tokens that are provided at the enterprise level or by other business entities. If the individuals were authorized, then a door controller might be signaled to unlock doors or not generate alarms, for example.

More recently, frictionless access control systems are being proposed and designed. These systems typically rely on individuals carrying user devices, such as dedicated fob devices or personal mobile computing devices such as tablet or smart phone commodity computing devices. The functionality might be supported by a special purpose application program, or app, executing on the mobile computing device that might be provided by a third-party app server. The user devices broadcast the credential information possibly using Bluetooth protocol radio frequency (RF) wireless transmissions. See IEEE standard 802.15.1 and Bluetooth low energy protocols. Then wireless readers of the access control systems will monitor and track the individuals as they move through the buildings using the RF transmissions. Access point controllers, such as a door controller, will then open access points such as doors when approached based on signaling from the wireless readers, assuming that the individuals are authorized to pass through those access points.

SUMMARY OF THE INVENTION

Some of these frictionless access control systems will determine locations of individuals relative to an access point based on the user device RF transmissions. In these systems, the wireless readers are located at each access point (e.g. door) and determine locations of users with respect to the access points' thresholds. The systems will also verify the users' credentials, also sent via the user device RF transmissions. The systems authorize the users based upon the credential information, and enable access by unlocking doors when the systems determine that the authorized users are present at the thresholds.

However, the use of RF transmissions, such as Bluetooth wireless signals, to determine locations of users in frictionless access control systems has limitations. The RF signals are attenuated by the users' bodies and thus the performance of the system can be affected by where the users carry the devices. Also, the RF signals can be reflected by structures surrounding the access points in sometimes unexpected and dynamic ways.

The present system is directed to a frictionless access control system that uses acoustic (e.g. ultrasonic) signals to locate and/or identify the users. The system might also use RF signals for some tracking and transmission of credential information.

In general, according to one aspect, the invention features an access control system for monitoring an access point. The access point includes a positioning unit and an access point controller. The positioning unit receives acoustic signals from user devices carried by users and generates position information for the user devices based on the acoustic signals. The position information indicates positions of the user devices relative to the access point. The positioning unit further generates instructions based on the position information, and the access point controller controls access through the access point in response to the instructions from the positioning unit.

The positioning unit includes one or more microphones installed above the access point. In a preferred embodiment, the positioning unit includes an ultrasonic microphone array for detecting the acoustic signals from the user devices.

The positioning unit also sends wireless signals to the user devices instructing the user devices to generate the acoustic signals. The user devices transmit the acoustic signals to the positioning unit in response to receiving wireless signals from the positioning unit. Additionally, the positioning unit sends wireless signals to different user devices instructing each of the different user devices to generate the acoustic signals at different carrier frequencies with respect to each other.

Typically, the positioning unit includes a wireless credential reader that receives user information identifying the users. The user information is included in radio frequency (RF) signals sent from the user devices.

Preferably, the positioning unit includes one or more microphones for detecting the acoustic signals, and an audio processing and location module that determines an angle of arrival of the acoustic signals at the one or more microphones based on the acoustic signals. The one or more microphones are arranged to form an ultrasonic microphone array, and the audio processing and location module determines a time difference of arrival of the acoustic signals across the microphone array.

In one implementation, the positioning unit includes an ultrasonic microphone array that includes microphones which are spaced apart by at least 4 millimeters (mm).

Typically, the positioning unit includes a controller that uses the positions of the user devices, in conjunction with user information identifying the users sent to the access control system from the user devices, to issue commands to control the access point.

Additionally and/or alternatively, the positioning unit instructs the access point controller to unlock or grant access through the access point controller in response to the positioning unit determining that the users are authorized based upon user information identifying the users sent from the user devices, and determining that the users are located within an inner zone of the access point based upon the position information.

Additionally and/or alternatively, the access control system pre-authorizes the users in response to the positioning unit determining that the users are located within an outer zone of the access point based upon the position information.

In general, according to another aspect, the invention features an access control system for monitoring an access point. The access control system includes an array of ultrasonic microphones and a wireless credential reader. The array of ultrasonic microphones receives acoustic signals from user devices carried by users to generate position information indicating positions of the user devices relative to the access point based on the acoustic signals, and the wireless credential reader receives user information identifying the users from the user devices from which the acoustic signals were received.

Additionally and/or alternatively, the access control system includes a controller that uses the positions of the user devices, in conjunction with the user information from the user devices, to issue commands to control the access point.

In general, according to yet another aspect, the invention features a method for controlling an access point. The method includes receiving acoustic signals from user devices carried by users, generating position information based on the acoustic signals, the position information indicating positions of the user devices relative to the access point, and controlling access through the access point in based on the position information.

In one example, the acoustic signals are detected by one or more microphones located above the access point. The user devices transmit user information identifying the users in RF signals.

In general, according to still another aspect, the invention features an access control method. The method comprises detecting acoustic signals from user devices carried by users and generating position information based on the acoustic signals, the position information indicating positions of the user devices relative to the access point. User information identifying the users is then wireless received from the user devices from which the acoustic signals were received, for example, as radio frequency (RF) transmissions.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4A is a front view of the door; FIG. 4B is a side view; and FIG. 4C is a plan view;

FIG. 5A-5C show plots of ultrasonic signals detected by two microphones forming one pair of the microphone array in FIG. 4C, where: the plot in FIG. 5A shows an ultrasonic signal detected at one microphone of the pair, and the plots in FIGS. 5B and 5C respectively show a maximum positively delayed version and a maximum negatively delayed version of the same ultrasonic signal, detected at the other microphone of the pair; and FIGS. 6A and 6B also show plots of ultrasonic signals detected by the two microphones in FIG. 5A-5C, where: FIG. 6A shows an ultrasonic signal detected at one microphone of the pair, as in FIG. 5A; and FIG. 6B shows a positively delayed version of the same ultrasonic signal detected at the other microphone, where the delay is beyond a maximum acceptable amount relative to a wavelength of the signals.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
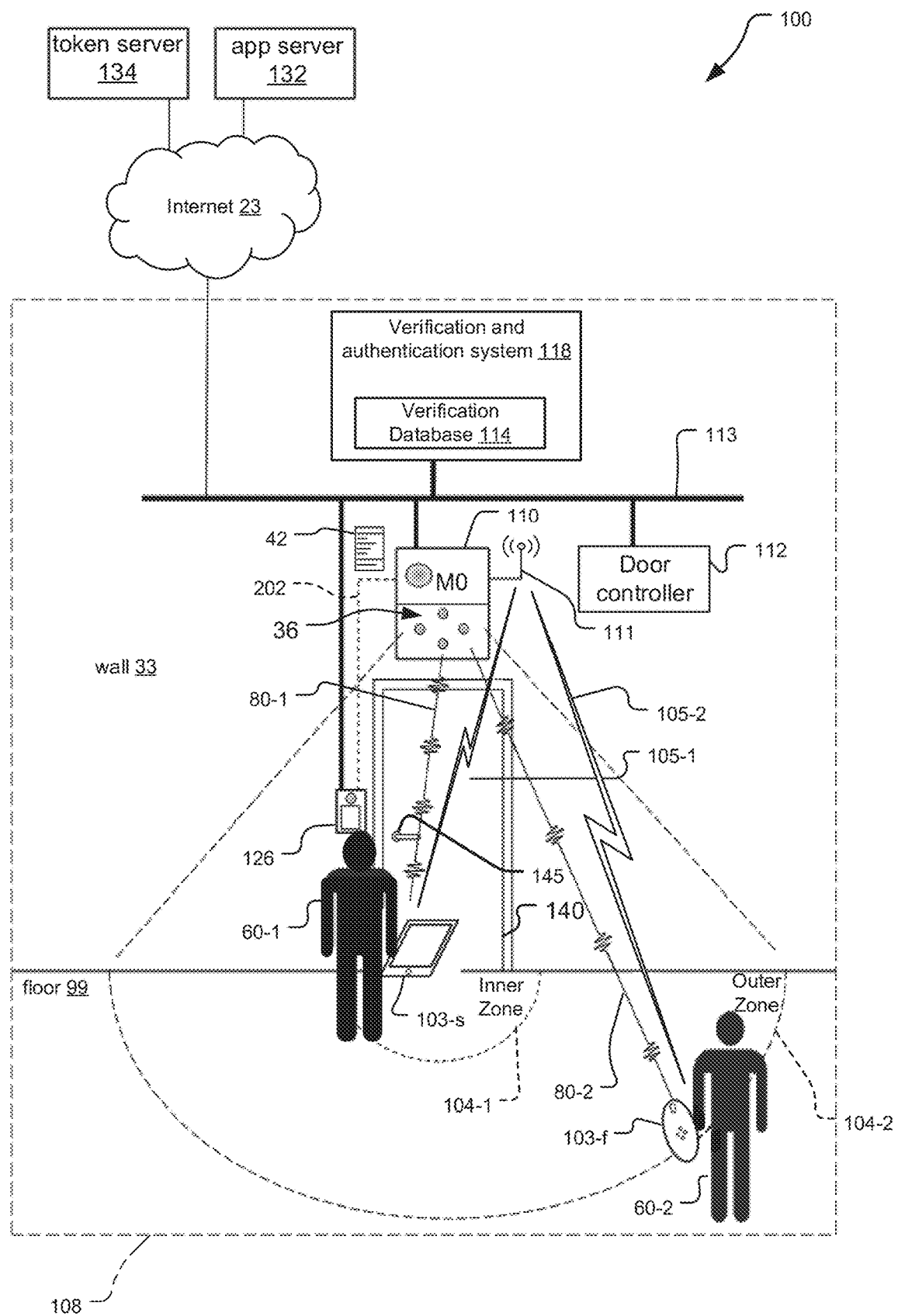
FIG. 1 is a schematic diagram showing a security system with a frictionless access control system detecting acoustic signals from user devices, according to the present invention.

FIG. 1 shows a security system 100 with an ultrasonic access control system 108, which has been constructed according to the principles of the present invention.

The access control system 108 includes a positioning unit 110 and an access point controller 112. In general, the positioning unit 110 determines positions of user devices 103 relative to an access point 140, such as a door. The positioning unit 110 also functions as a control system by, for example, sending instructions to the access point controller 112. The access point controller 112 controls access through the access point 140 based on the positions of the user devices 103 and possibly other factors.

In a typical implementation, users 60 carry the user devices 103 (e.g., fobs, smartphones, tablets, phablets, or other mobile computing devices). The user devices 103 generate and transmit acoustic signals 80 and broadcast user information 42. In the illustrated example, user device 103-s is a mobile computing device (smartphone) carried by user 60-1, and user device 103-f is a fob carried by user 60-2.

The user devices 103 include one or more applications ("apps") that run/execute upon an operating system of the user devices 103. The user devices 103 download the apps from an app server 132 which operates at the enterprise level or is owned by a different business entity. The users 60 and/or user devices 103 communicate with the positioning unit 110 via the apps running on the user devices 103. In examples, one or more apps enable the user devices 103 to transmit acoustic signals 80, user information 42, and control signals, and to receive and process acknowledgements and control signals from the positioning unit 110.

In the illustrated example, the app server 132 and a token server 134 communicate with the access control system 108 and/or the user devices 103 via one or more connected networks such as the internet 23.

The user devices 103 transmit the acoustic signals 80, either continuously, or intermittently, for example, in response to receiving control signals from the positioning unit 110. Each of the different user devices 103 generate acoustic signals 80 at different carrier frequencies with respect to each other, in one example. In the illustrated example, user device 103-s generates acoustic signals 80-1 and user device 103-f generates acoustic signals 80-2. In one implementation, the acoustic signals 80 are sinusoidal tones having a specified frequency. In other examples, the acoustic signals 80 may further encode additional information in the phase and/or frequency modulation of the acoustic signals.

Based on the acoustic signals 80 received from the user devices 103, the positioning unit 110 determines whether or not the user devices 103 and thus the users 60 are on or near a threshold (e.g. one or more zones 104 of the access point 140). In the illustrated example, an inner zone 104-1 is located at a threshold of the access point 140, and an outer zone 104-2 begins at the end of the inner zone 104-1 and extends further away from the access point 140.

The positioning unit 110 includes one or more microphones for detecting the acoustic signals 80 transmitted by the user devices 103. In a preferred embodiment, an ultrasonic microphone array 36 of the positioning unit 110 includes one or more microphones for detecting the acoustic signals 80 from the user devices 103 at different locations. In other examples, single or multiple directional microphone(s) could be used. The positioning unit 110 also includes omnidirectional microphone M0 in the illustrated embodiment.

Placement of the positioning unit 110 relative to the access point 140 is important. Specifically, the ultrasonic microphone array 36 of the positioning unit 110 is preferably located above the access point 140. For this purpose, the positioning unit 110 is typically mounted to a wall 33 at a location above the access point 140. The positioning unit 110 uses an angle of arrival (AoA) of the acoustic signals 80 at the ultrasonic microphone array 36 to determine whether the user devices 103 and thus the users 60 are proximate to the access point 140. This AOA includes both an azimuth angle and an elevation angle that define the AOA. From the AoA, the positioning unit 110 can determine the position of the users 60 relative to the access point 140. Determining position typically involves application of assumption concerning the geometry of the area around the positioning unit. For example, it is assumed that the acoustic signals are generated above the plane of the floor below the unit.

The positioning unit 110 also receives user information from and sends the control signals to the user devices 103 via radio frequency (RF) signals 105. To this end, the positioning unit 110 includes an RF antenna 111 for sending and receiving the RF signals 105 to and from the user devices 103. The positioning unit 110 extracts the user information 42 from the RF signals 105 received via the RF antenna 111.

In one implementation, the RF signals 105 are exchanged between the positioning unit 110 and the user devices 103 using Bluetooth Low Energy (BLE) technology. Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. BLE is a lower power version of standard Bluetooth and, in contrast, consumes between ½ and ¹⁄₁₀₀ the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

The user information 42 broadcast by the user devices 103 includes credentials of the users 60 (e.g. user name and password) and/or a unique ID for each of the user devices 103 and/or users 60, in examples. In the illustrated example, the user information 42 further includes tokens created by a token server 134 which functions at the enterprise level or is owned by a different business entity. The user information 42 is secured to prevent unauthorized third parties from intercepting and viewing the broadcast data.

The control signals sent from the positioning unit 110 to the user devices 103 include instructions for the user devices 103 to perform different functions. In one example, the positioning unit 110 instructs the user devices 103 to begin generating and transmitting the acoustic signals 80 in response to positioning unit 110 receiving the user information 42 from the user devices. In another example, the positioning unit 110 instructs the user devices 103 to generate the acoustic signals 80 in response to receiving an indication from the verification and authentication system 118 that the users 60 are authorized. In another example, the positioning unit 110 instructs each of the user devices 103 to generate and transmit acoustic signals 80 at different carrier frequencies with respect to each other in response to receiving user information 42 from two or more different user devices 103. In this way, the acoustic signals 80-1 and 80-2 respectively generated from different user devices 103-s and 103-f can be distinguished from one another when received by the positioning unit 110. In another example, the positioning unit instructs each of the user devices 103 to generate and transmit phase modulated or frequency modulated acoustic signals 80, in which the modulation encodes different numbers.

The positioning unit 110 authorizes the user devices 103 and/or users 60 by sending the extracted user information 42 for each of the users 60 to a verification and authentication system 118 via a local network 113.

The verification and authentication system 118 receives the user information 42 and compares the user information 42 to that of authorized users 60 in a verification database 114. It may further compare tokens contained in the user information 42 to tokens provided by the token server 134. Upon authorizing the users 60, the verification and authentication system 118 returns authorization information to the positioning unit 110 indicating whether or not the users 60 are authorized to pass through the access point 140, for example.

Based on the positions of the user devices 103 and/or the authorization information, the positioning unit 110 sends control signals to the access point controller 112 to control the access point 140, for example, by granting access to the user 60 through the access point 140.

The access point controller 112 controls the access point 140 in response to receiving control signals from the positioning unit 110. The access point controller 112 will take a number of different forms in different examples. In one example, it is a conventional door controller that unlocks and/or automatically opens a door. In another example, the access point controller 112 is an elevator controller that controls elevator doors to open for authorized users and possibly provides floor access or restricted access to floors based on the security policies and the users. In another example, the access point controller 112 is a door lock that is automatically unlocked for authorized users. In still another example, the access point controller 112 is part of the larger security system 100. In this case, it might monitor a hallway and signal an alarm when unauthorized users are detected trying to transit the hallway.

In one example, if the positioning unit 110 determines that authorized users 60 are located within the inner zone 104-1, the positioning unit 110 sends control signals instructing the door controller 112 to unlock the access point 140 or otherwise allow the authorized users 60 to transit the access point 140. Users 60 can then turn door handle 145 of the access point 140 and enter the restricted area(s) behind the access point 140, in one concrete example.

However, when the authorized users 60 are determined to be outside the threshold area, such as within outer zone 104-2 or further away, the positioning unit 110 does not send the unlock signals to the door controller 112. This handles a scenario in which an authorized user 60 is merely walking past the access point 140 but does not intend to pass through it.

The positioning unit 110 also includes a card reader and display device 126 in some examples. The card reader and display device 126 is installed as a secondary or backup user authorization mechanism. The card reader and display device 126 authorizes users 60 when the users 60 are not carrying user devices 103, the user devices 103 are not operating properly, or when the user devices 103 have outdated and/or invalid user information 42, in examples. The card reader and display device 126 communicates with the positioning unit over a separate communications channel 202.

Users 60 swipe keycards that include user information 42 identifying the users 60 at the card reader and display device 126 to gain entry to the access point 140. The card reader and display device 126 sends the user information 42 via the channel 202 to the positioning unit 110. The positioning unit 110 forwards the user information 42 to the verification and authentication system 118 to determine whether the users 60 are authorized.

Figure 2:
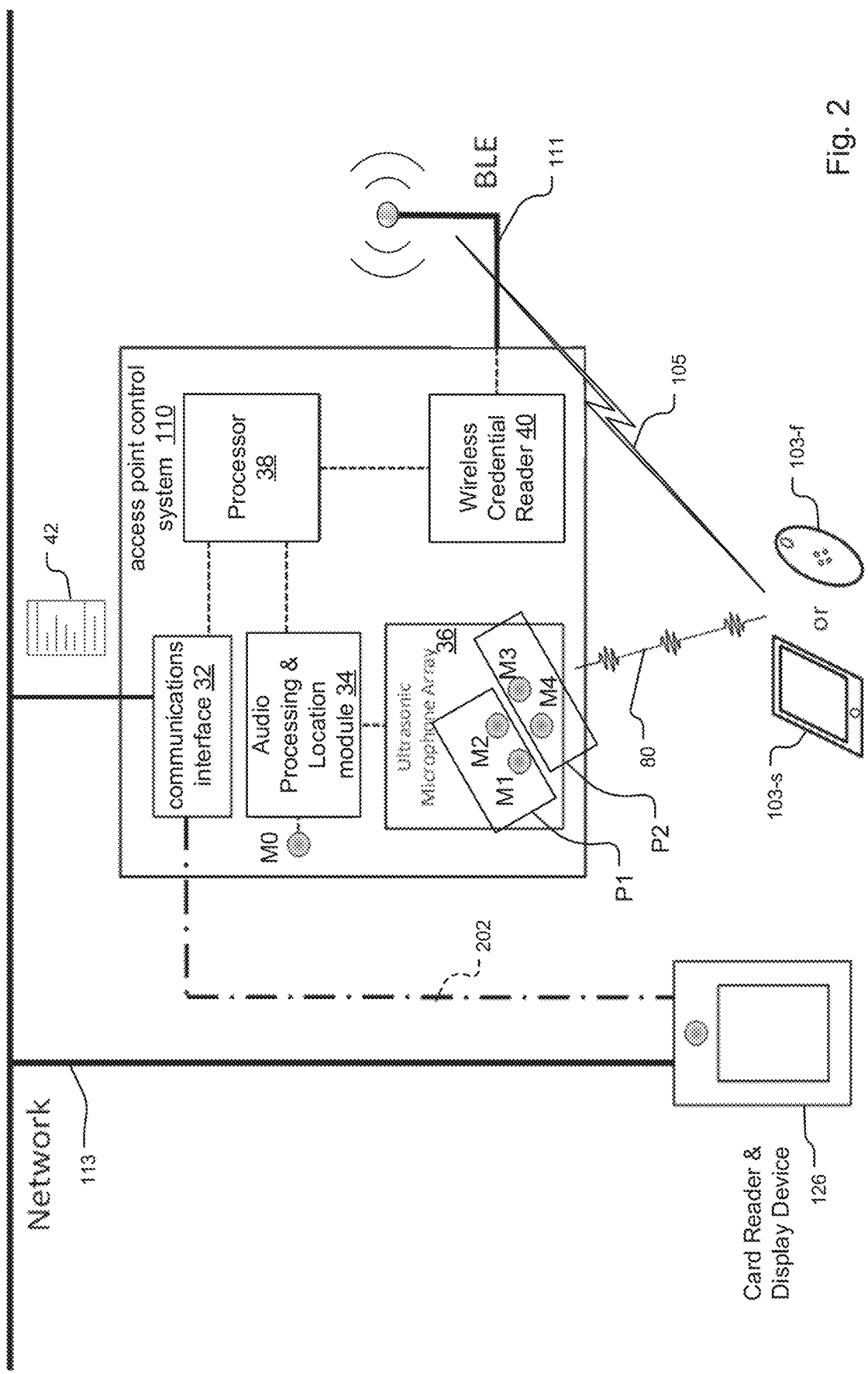
FIG. 2 is schematic diagram showing more detail for an positioning unit and its ultrasonic microphone array.

FIG. 2 shows more detail for the positioning unit 110.

The positioning unit 110 includes a communications interface 32 and a processor 38 in addition to the previously described microphone array 36 and omnidirectional microphone M0. The communications interface 32 communicates with the processor 38 and controls communications over the local network 113. The communications interface 32 also controls communications over the separate channel 202 between the positioning unit 110 and the card reader and display device 126.

The positioning unit 110 also includes a wireless credential reader 40 that receives the user information 42 in the RF Bluetooth signals 105 from the user devices 103. The wireless credential reader 40 communicates with the processor 38 and the RF antenna 111. When the user devices 103 send the RF signals 105 including the user information 42, the RF antenna 111 receives the RF signals 105, and the wireless credential reader 40 extracts the user information 42 from the received RF signals 105. The wireless credential reader 40 then forwards the user information 42 to the processor 38. The processor 38 sends the user information 42 to the communications interface 32 for transmission over the local network 113 to the verification and authentication system 118.

The processor 38 also controls transmission of RF signals 105 sent to the user devices 103. In one example, upon receiving an indication from the verification and authentication system 118 that the users 60 are authorized, the processor 38 sends control signals to the user devices 103 as RF signals 105 transmitted via the RF antenna 111. The control signals instruct the user devices 103 to generate the acoustic signals 80, in one example.

The positioning unit 110 also includes an audio processing and location module 34. The audio processing and location module 34 processes the acoustic signals 80 detected by the array of microphones 36 and the omnidirectional microphone M0. The audio processing and location module 34 receives the audio signals 80 detected by the microphones, and communicates with processor 38.

In the illustrated example, ultrasonic microphone array 36 includes microphone pairs P1 and P2. Pair P1 includes microphones M1 and M2, and pair P2 includes microphones M3 and M4. The pairs P1 and P2 detect acoustic signals 80 generated from user devices 103. The microphones M1-M4 of pairs P1/P2 are arranged to form a 2×2 ultrasonic microphone array 36. The microphones M1-M4 are preferably spaced apart by at least 4 mm.

The omnidirectional microphone M0 also detects the audio signals 80. The omnidirectional microphone M0 determines a signal strength of the audio signals 80, and sends the signal strength information to the audio processing and location module 34. When audio signals 80 from multiple user devices are received by the omnidirectional microphone M0, the signal strength information of the audio signals 80 are compared by the audio processing and location module 34 to determine which of the users 60 are closest to the access point 140, in one example.

The audio processing and location module 34 also determines the AoA of the acoustic signals 80 across the spatially distributed microphones M1-M4 of the ultrasonic microphone array 36. In the illustrated example, the AoA measurement is executed at pair P1, and at pair P2. The audio processing and location module 34 determines a time difference of arrival (TDOA) of the acoustic signals 80 across the microphone array 36, and determines the AoA of the acoustic signals 80 based on the TDOA. The audio processing and location module 34 then generates position information indicating estimated positions of the user devices 103 and/or users 60 relative to the access point 140 based upon the AoA, and forwards the position information to the processor 38.

The processor 38 uses the position information, in conjunction with the user information 42, to issue commands to control the access point 140. In one example, after the processor 38 has sent the user information 42 to the verification and authentication system 118 and receives authorization information indicating that the users 60 are authorized in response, the processor 38 analyzes the position information. When the position information indicates that the user devices 103 (and therefore that the users 60) are located within the threshold, such as within inner zone 104-1, the processor 38 issues commands/sends instructions to the door controller 112 to unlock the access point 140. In a typical example, the inner zone 104-1 covers a range of less than 3 meters, such as about 1 meter, from the access point 140.

The ability of the positioning unit 110 to determine location/position of users 60 based on acoustic signals 80 is facilitated by the slower wave propagation velocity of an acoustic signal 80 versus an RF signal 105. Specifically, the wave propagation velocity of RF signals 105 is on the order of $10^6$ times higher than that of acoustic signals 80. Thus, the difference in time of arrival of sound waves, between two spaced detectors (such as pairs P1/P2 of microphone array 36), is correspondingly on the order of $10^6$ times greater than that of an RF signal 105. The greater difference of arrival time of acoustic signals 80 not only enables easier calculation of user position relative to the access point 140, but also utilizes lower cost components than RF based location systems and methods.

In another implementation, the access control system 108 can pre-authorize the users 60 for entry to the access point 140. As the user devices 103 carried by the users 60 approach outer zone 104-2, for example, the user devices 103 send the user information 42 in to the positioning unit 110, which sends the user information 42 to the verification and authentication system 118. The verification and authentication system 118 then determines whether the users 60 are authorized before the users 60 enter the inner zone 104-1. Once the positioning unit 110 determines that the pre-authorized users are positioned/located within inner zone 104-1, based upon the acoustic signals 80 generated by the user devices 103, the positioning unit 110 can signal the door controller 112 to open/unlock the access point 140 with a low latency.

Figure 3:
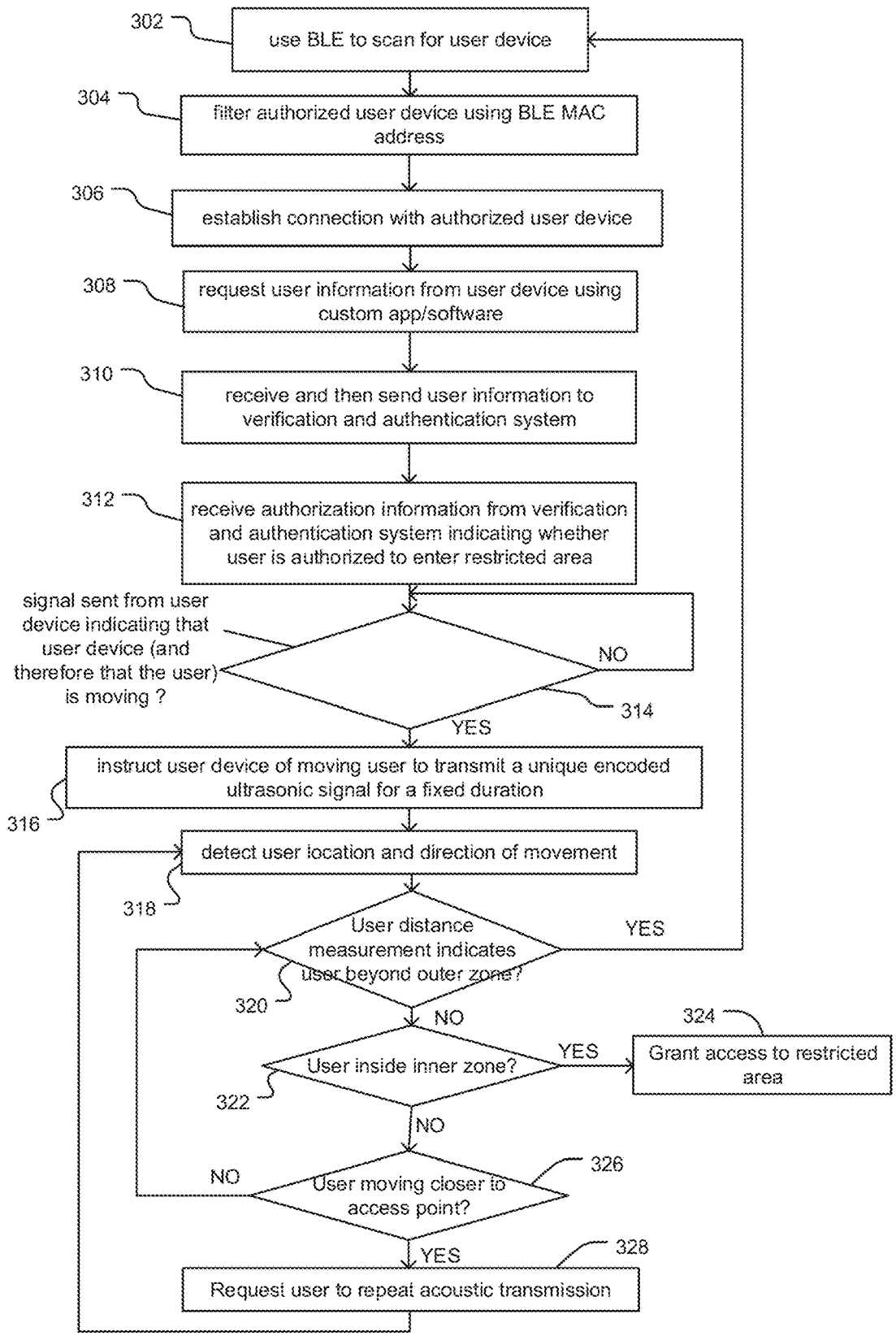
FIG. 3 is a flow diagram showing a method of operation of the positioning unit, for controlling access to an access point for a user based on detected ultrasonic signals and user information transmitted via Bluetooth transmissions.

FIG. 3 describes a method of operation of the positioning unit 110. The method describes the ability of the positioning unit 110 to authorize and determine the position of an exemplary single user 60 relative to the access point 140. Based on the position of the user 60, the method infers that the user 60 is located within an inner zone 104-1 of the access point 140, and instructs the door controller 112 to unlock the access point 140 in response.

In more detail, in step 302, the positioning unit 110 (via its RF antenna 111) uses wireless RF signals 105 such as BLE signals to scan for the presence of a user device 103 carried by a user 60. In one example, the positioning unit 110 might passively wait to detect RF signals 105 from the user devices 103. In other examples, the positioning unit 110 generates a beacon that causes the user devices to respond with their RF signal 105.

According to step 304, the positioning unit 110 filters authorized user devices 103 using the BLE MAC address of the user devices 103, in one implementation. For this purpose, in one example, the positioning unit 110 periodically obtains a list of MAC addresses of authorized users from the verification database 114 and stores the list to a local cache. The positioning unit 110 receives MAC addresses of user devices 103 in BLE wireless messages 105 sent from the user devices 103, and compares the received MAC addresses to those of authorized user devices 103 within the local cache.

In step 306, the positioning unit 110 establishes an RF wireless connection 105 with the authorized user device 103, via the wireless credential reader 40 and the RF antenna 111. In step 308, the positioning unit 110 requests user information 42 from the user device 103 using custom application software running on the user device 103. The user device 103 transmits the user information 42 as RF signals 105 to the positioning unit 110.

According to step 310, the positioning unit 110 receives the user information 42 from the user device 103, and sends the user information 42 to the verification and authentication system 118 over the local network 113 to authorize the user 60. The verification and authentication system 118 compares the received user information 42 to a list of authorized users 60 for the access point 140. The list of authorized users 60 is stored within the verification database 114.

In step 312, the positioning unit 110 receives authorization information from the verification and authentication system 118 over the local network 113. The authorization information indicates whether or not the user 60 is authorized to enter a restricted area, such as areas behind access point 140.

Then, in step 314, the positioning unit 110 waits to receive movement information from the user device 103. The movement information is generated by the user device 103, for example, via an accelerometer of the user device 103 detecting movement, and indicates that the user device 103 (and therefore that the user 60) is moving. The method transitions to step 316 upon receiving the movement information indicating movement from the user device 103. Otherwise, the method transitions back to the beginning of step 314 to await the movement information from the user device 103.

According to step 316, the positioning unit 110 instructs the user device 103 of the moving user 60 to transmit a unique acoustic (e.g. ultrasonic) signal 80 for a fixed duration. This signal might be a tone of a specified frequency in the ultrasonic frequency band. As a general rule, most adults cannot hear acoustic signals at frequencies greater than 16 kHz. On the other hand, user devices 103 can generate acoustic signals at these frequencies or higher and stretching into frequencies greater than 20 kHz, which cannot be heard by humans. For this purpose, the processor 38 includes the instruction in an RF control signal 105 that the RF antenna 111 transmits to the user device 103.

The user device 103 receives the RF wireless control signal 105 and transmits a unique, encoded ultrasonic signal 80 for a fixed duration in response. The frequencies of the acoustic signals 80 are typically within a range of 18 kHz (kilohertz) and 21 kHz. This frequency range is high enough to be inaudible to users 60, and is also low enough to be generated by standard sound hardware and/or software modules of user devices 103.

In step 318, the positioning unit 110 generates position information indicating the user's 60 location/position and direction of movement based upon the acoustic signals 80. From the position information, the positioning unit 110 calculates a distance measurement between the ultrasonic microphone array 36 and the user 60.

In step 320, the positioning unit 110 first determines if the user distance measurement indicates that the user 60 is located beyond outer zone 104-2. If the user 60 is located outside outer zone 104-2, the method transitions back to step 302. Otherwise, the method transitions to step 322.

In step 322, the positioning unit 110 determines if the user distance measurement indicates that the user 60 is located within inner zone or threshold 104-1. If the user 60 is located within inner zone 104-1, the positioning unit 110 grants access to the restricted area in step 324 to those authorized users 60. In one example, the positioning unit 110 grants access to the restricted area by sending an unlock signal to door controller 112, which in turn unlocks the access point 140. Otherwise, the method transitions to step 326.

In step 326, the positioning unit 110 determines whether the user 60 is located somewhere beyond inner zone 104-1 but is moving closer to the access point 140. If the user 60 is not moving toward the access point 140, the method transitions to step 320 to repeat the position determination. Otherwise, the method transitions to step 328.

According to step 328, the positioning unit 110 requests that the user device 103 repeat the transmission of the acoustic signal 80. For this purpose, the positioning unit 110 sends a control signal to the user device 103, in one example. The method then transitions back to the beginning of step 318, to determine the location/position and direction of movement of the user 60 from the acoustic signal 80 generated by the user device 103.

Figure 4A:
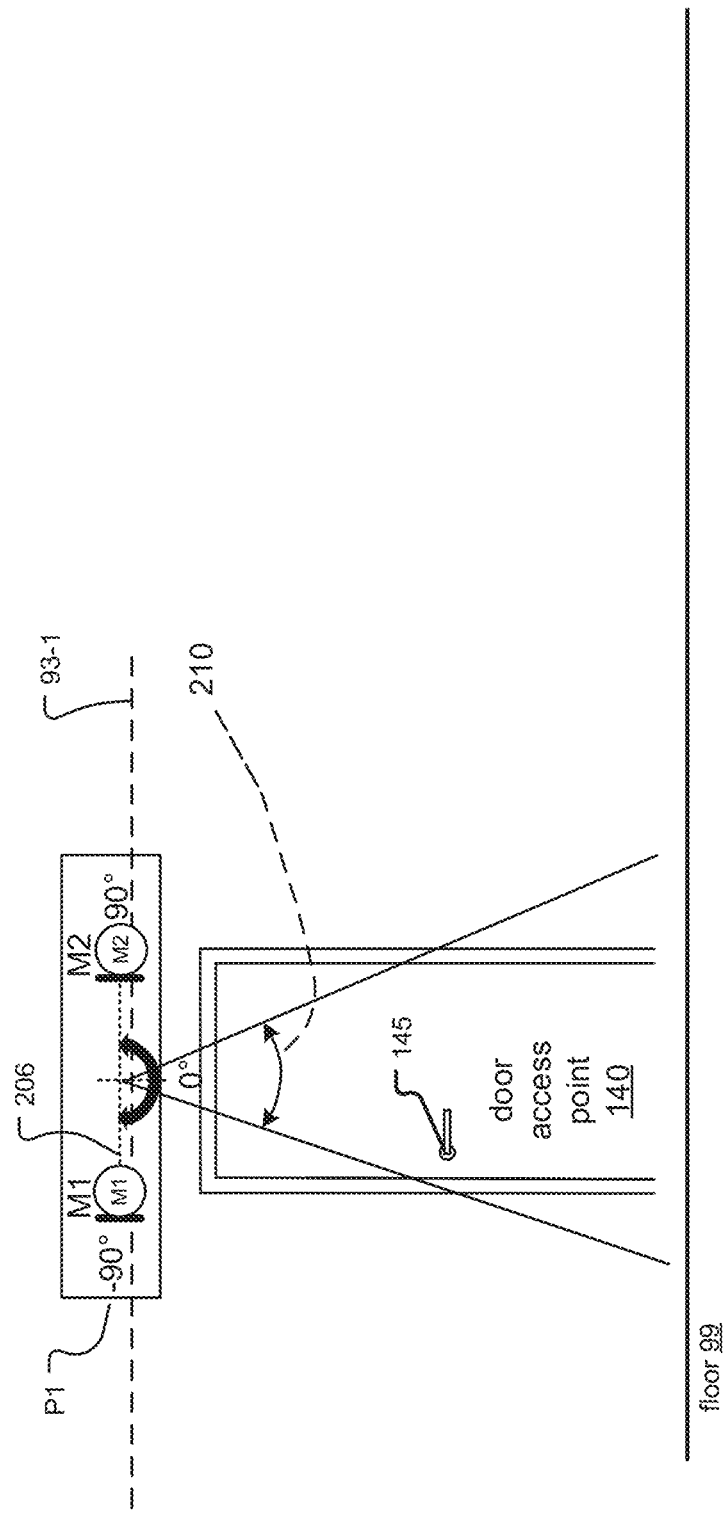
FIG. 4A-4C are different views of a door access point that includes an ultrasonic microphone array of the positioning unit, where.

FIG. 4A shows more detail for pair P1 of microphones of the ultrasonic microphone array 36 in FIG. 2. The ultrasonic microphone array 36 is installed above door access point 140. Specifically, in the illustrated example, the microphones of the array 36 are located in a plane that is parallel to the ceiling and floor 99. An axis 93-1 of pair P1 that extends through microphones M1 and M2 is also shown.

The microphones M1 and M2 of pair P1 are spaced somewhat apart from each other. If the acoustic signals 80 generated by the user device 103 are detected at a far enough distance by the microphones M1 and M2 of the pair P1, the acoustic signals 80 can be approximated as a plane wave incident upon the pair P1 rather than a wave of circular shape.

The audio processing and location module 34 determines the TDOA 206 of the acoustic signals 80 between M1 and M2, and determines an AoA 210 from the TDOA 206. The TDOA 206 is determined by measuring the difference in phase of the acoustic signals 80 detected at both microphones M1 and M2. The TDOA 206 is then converted to an angle in degrees to obtain the AoA 210 measurement. In one example, determination of the AoA 210 be can be thought of as beamforming in reverse. In beamforming, the signal from each element/pair of antennas in an antenna array is delayed by some weight to "steer" the gain of the antenna array.

Figure 4C:
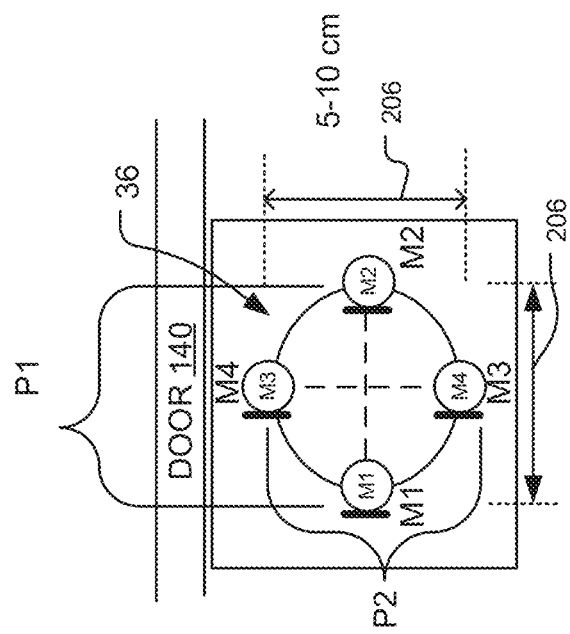
Figure 4B:
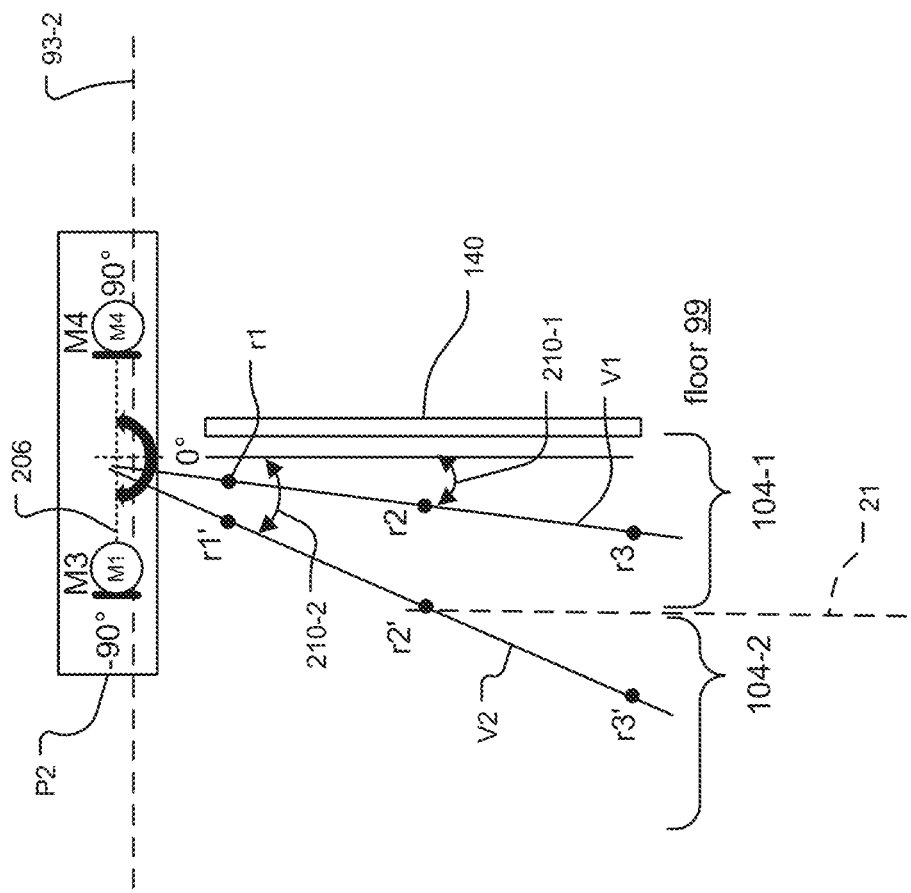

FIG. 4B shows another pair P2 of the ceiling mounted microphones of the 2x2 embodiment of the ultrasonic microphone array 36. A side view of door access point 140 is shown. An axis 93-2 of pair P2 that extends through microphones M3 and M4 is located in a plane that is perpendicular to the ceiling and floor 99.

As in FIG. 4A, the measurement of the TDOA 206 is made by measuring the difference in received phase of each microphone M3 and M4 of pair P2. The TDOA 206 is then converted to an AoA 210 angle in degrees.

The position of the user 60 relative to the access point 140 can be accurately determined from the AoA 210 when the user 60 is located within close proximity of the access point 140, such as within zone 104-1. This is possible due to geometry constraints of the positioning unit 110 and its ultrasonic microphone array 36, relative to the access point 140. The ultrasonic microphone array 36 is located above the door access point 140 and therefore above the users 60. The users 60 approach the access point 140 while standing on floor 99, which is at a fixed distance relative to the ultrasonic microphone array 36.

In more detail, with respect to FIG. 4B, two different AoAs 210-1 and 210-2 are shown. Both AoAs 210 are acute angles, but AoA 210-1 is a much smaller acute angle than that of AoA 210-2. Range vectors V1 and V2 extend down from the ultrasonic microphone array 36 towards the floor 99, at angles given by AoA 210-1 and 210-2, respectively. Positions r1 and r1' of users 60, at vectors V1 and V2, respectively, are at the same height from floor 99. In a similar fashion, positions r2 and r2' are each located at the same height from floor 99, but are lower in height than r1/r1'; and positions r3 and r3' of users 60 are each located at the same height relative to the floor 99, but are lower in height than r2/r2'.

The positioning unit 110 concludes that positions of the users 60 determined from AoA 210-1 are within inner zone 104-1. Because AoA 210-1 is very acute, all positions r1, r2, and r3 along vector V1 differ little in range between the access point 140. Because small acute AoA 210 values have little range ambiguity, the positioning unit 110 can conclude that AoA 210-1 value is associated with acoustic signals 80 sent from user devices 60 that are positioned within inner zone 104-1.

In contrast, the positioning unit 110 has difficulty determining positions of the users 60 from AoA 210-2. This is because larger AoA 210-2 value has increased range ambiguity. Though position r1' is within range of/located within inner zone 104-1, position r2' is located at a boundary 21 between inner zone 104-1 and outer zone 104-2, and position r3' is located within outer zone 104-2. As a result, accuracy of the system decreases with increasing AoA 210 values.

FIG. 4C shows both pairs P1/P2 of microphones of the 2x2 embodiment of microphone array 36, according to a plan view of the door access point 140. The TDOA 206 of the microphones M1/M2 of pair P1 and that of microphones M3/M4 of pair P2 are also shown. The TDOAs 206 are not drawn to scale and are exaggerated for illustration purposes.

The microphones M1/M2 and M3/M4 of each pair P1/P2 are physically separated by a distance of at least 4 mm. Typically, the microphones are separated by a distance in the range of 5-10 centimeters. This distance is preferably on the order of a quarter wavelength of the acoustic signals 80.

Each TDOA measurement 206 for pairs P1 and P2 is effectively two dimensional, but collectively the TDOA measurements 206 for each of the pairs P1/P2 provide the position of the user device 103 in three dimensions. By adding restrictions to the AoA 210, one or more zones 104 of the access point are defined to determine if the user 60 carrying the user device 103 is within a predetermined distance from the door access point 140. By determining the AoA 210 of the acoustic signal 80 detected at microphones M1 and M2 of pair P1, and similarly for microphones M3/M4 of pair P2, the position of the sound source (e.g. user device 103 carried by a user 60) relative to the access point 140 can be determined.

FIG. 5A-5C are plots of exemplary acoustic signals 80 such as ultrasonic signals detected at the ultrasonic microphone array 36. Here, plots of acoustic signals 80 detected at microphones M1 and M2 of pair P1 of the array 36 are shown.

The acoustic signals 80 are incident upon microphones M1 and M2 of pair P1 of the array 36. Ultrasonic signal 80 is first detected at microphone M1 in FIG. 5A. In one example, the ultrasonic signal 80 has a frequency of 18 KHz. The same acoustic signal 80 is then detected at a slightly later point in time by microphone M2 in FIG. 5B, and at a slightly earlier time in FIG. 5C.

Because the acoustic signal 80 is detected at a different point in time at M2 than at M1, the acoustic signal 80 at M2 is shifted in phase as compared to the acoustic signal 80 detected at M1. The audio processing and location module 34 determines a TDOA 206 across the microphones of the array 36 from the phase shift, and the AoA 210 of the acoustic signals 80 is determined from the TDOA 206.

Reference A in FIG. 5B indicates a maximum positive delay/phase shift of the acoustic signals 80 detected at microphone M2, relative to the acoustic signals 80 detected at microphone M1 in FIG. 5A. In a similar vein, reference A' in FIG. 5C indicates a maximum negative delay/phase shift of the acoustic signals 80 detected at microphone M2, relative to the acoustic signals 80 detected at microphone M1. The value of A is preferably on the order of a quarter wavelength of the acoustic signals 80. A phase shift that is greater than a quarter wavelength will result in incorrect TDOA 206 and AoA 210 measurements, and therefore an incorrect position measurement of the user 60 relative to the access point 140.

In the illustrated example, the wavelength of the acoustic signals 80 is between 16-18 mm, and a 4 mm spacing between microphones M1 and M2 was utilized. This spacing provides a phase shift A or A' that is approximately on the order of a quarter of the wavelength of the acoustic signals 80.

FIGS. 6A and 6B are plots of ultrasonic signals 80 that collectively illustrate potential problems when detecting the acoustic signals 80 at the array of microphones 36. FIG. 6A shows an acoustic signal 80 detected at microphone M1 of pair P1, and FIG. 6B shows the same acoustic signal 80 detected at microphone M2, sometime later.

The delay/phase shift of the acoustic signal 80 at M2 is indicated by reference A" and is more than a quarter wavelength of the acoustic signal 80. Because the acoustic signal 80 at M2 has been delayed/shifted in phase beyond a quarter wavelength of the signals, the array of microphones 36 will incorrectly interpret the delay as a phase shift in the opposite direction, indicated by reference B. To resolve this issue, a technician would adjust the spacing between the microphones M2/M1, in one example.

While this invention has been particularly shown and described with references to preferred embodiments thereof, it will be understood by those skilled in the art that various changes in form and details may be made therein without departing from the scope of the invention encompassed by the appended claims.

What is claimed is:

1. An access control system for monitoring an access point, comprising:

a positioning unit for receiving acoustic signals from user devices of users, for generating position information indicating positions and directions of movement of the user devices relative to the access point based on the acoustic signals, and for generating instructions based on the position information, wherein the positioning unit includes one or more microphones installed above the access point for detecting the acoustic signals from the user devices; and an access point controller for controlling access through the access point in response to the instructions from the positioning unit, wherein the positioning unit comprises an audio processing and location module for determining an angle of arrival of the acoustic signals at the one or more microphones based on the acoustic signals, and the positioning unit determines that the user devices are within an inner zone of the access point based on whether the angle of arrival is sufficiently small.

2. The system of claim 1, wherein the positioning unit includes an ultrasonic microphone array for detecting the acoustic signals from the user devices.

3. The system of claim 1, wherein the user devices transmit the acoustic signals to the positioning unit in response to receiving wireless signals from the positioning unit.

4. The system of claim 1, wherein the positioning unit sends wireless signals to different user devices instructing each of the different user devices to generate acoustic signals at different carrier frequencies with respect to each other.

5. The system of claim 1, wherein the positioning unit comprises a wireless credential reader for receiving radio frequency (RF) signals from the user devices, the RF signals including user information identifying the users.

6. The system of claim 5, wherein the positioning unit determines whether the user devices are authorized by sending the user information to a verification and authentication system via a local network and receiving authentication information returned from the verification and authentication system, the authorization information indicating whether or not the users of the user devices are authorized to pass through the access point.

7. The system of claim 6, wherein the verification and authentication system compares the user information to that of authorized users in a verification database and/or compares tokens contained in the user information to tokens provided by a token server.

8. The system of claim 6, wherein the positioning unit, in response to determining that the users of the user devices are authorized users and that the user devices are located within an inner zone of the access point, sends unlock signals to the access point controller, and the positioning unit, in response to determining that the users of the user devices are authorized users and that the user devices are located beyond an inner zone of the access point, does not send the unlock signals to the door controller.

9. The system of claim 6, wherein, in response to receiving the authorization information, the positioning unit obtains movement information from the user devices, the movement information being generated via accelerometers of the user devices detecting movement and the movement information indicating whether the user devices are moving.

10. The system of claim 9, wherein, in response to determining that the users of the user devices are authorized users and that the user devices are located beyond an inner zone of the access point but are moving closer to the access point, the positioning unit requests that the user devices repeat transmission of the acoustic signals.

11. The system of claim 1, wherein the one or more microphones includes an ultrasonic microphone array, which comprises a plurality of microphones arranged to form the ultrasonic microphone array, and the audio processing and location module determines a time difference of arrival of the acoustic signals across the microphone array.

12. The system of claim 11, wherein the positioning unit determines the angle of arrival based on the time difference of arrival of the acoustic signals across the microphone array by measuring a difference in phase of the acoustic signals detected at each of the one or more microphones and converting the time difference of arrival to the angle of arrival.

13. The system of claim 12, wherein the positioning unit determines the position of the user device relative to the access point based on the angle of arrival.

14. The system of claim 13, wherein the angle of arrival includes an elevation angle and an azimuth angle.

15. The system of claim 13, wherein spacing between a first microphone and a second microphone of the microphone array provides a phase shift for the acoustic signals detected at the first microphone relative to the acoustic signals detected at the second microphone on the order of a quarter wavelength of the acoustic signals.

16. The system of claim 15, wherein the wavelength of the acoustic signals is between 16-18 millimeters, and spacing between the microphones of the microphone array is 4 millimeters.

17. The system of claim 12, wherein the microphones of the microphone array are located in a plane that is parallel to or perpendicular to a ceiling and floor above and below the access point, respectively.

18. The system of claim 1, wherein the one or more microphones are arranged to form an ultrasonic microphone array comprising microphones which are spaced apart by at least 4 millimeters.

19. The system of claim 1, wherein the positioning unit generates the instructions based on user information identifying the users sent received from the user devices.

20. The system of claim 1, wherein the positioning unit instructs the access point controller to grant access through the access point in response to the positioning unit:
 determining that the users are authorized based on user information identifying the users received from the user devices; and
 determining that the users are located within an inner zone of the access point based on the position information.

21. The system of claim 1, wherein the system pre-authorizes the users in response to the positioning unit determining that the users are located within an outer zone of the access point based on the position information.

22. A method for controlling an access point, comprising:
 one or more microphones of a positioning unit for receiving acoustic signals from user devices of users installed above the access point detecting the acoustic signals from the user devices;
 the positioning unit generating position information indicating positions and directions of movement of the user devices relative to the access point based on the acoustic signals, including an audio processing and location module of the positioning unit determining an angle of arrival of the acoustic signals at the one or more microphones based on the acoustic signals received from the user devices and the positioning unit determining that the user devices are within an inner zone of the access point based on whether the angle of arrival is sufficiently small;
 the positioning unit generating instructions based on the position information; and an access point controller controlling access through the access point in response to the instructions from the positioning unit.

23. The method of claim 22, further comprising an ultrasonic microphone array detecting the acoustic signals.

24. The method of claim 22, further comprising sending wireless signals to the user devices instructing the user devices to transmit the acoustic signals.

25. The method of claim 22, further comprising sending wireless signals to different user devices instructing each of the different user devices to generate acoustic signals at different carrier frequencies with respect to each other.

26. The method of claim 22, further comprising receiving radio frequency (RF) signals from the user devices, the RF signals including user information identifying the users.

27. The method of claim 22, further comprising controlling access through the access point based on the position information and user information identifying the users.

28. The method of claim 22, further comprising granting access through the access point in response to:
 determining that the users are authorized based on user information identifying the users sent from the user devices; and
 determining that the users are located within an inner zone of the access point based on the position information.

29. The method of claim 22, further comprising pre-authorizing the users in response to determining that the users are located within an outer zone of the access point based on the position information.

* * * * *